United States Patent [19]

La Barre

[11] 3,779,094
[45] Dec. 18, 1973

[54] REVERSING NUT FOR A DIAMOND THREAD SCREW

[75] Inventor: Berger A. La Barre, Bethel, Conn.

[73] Assignee: Norco, Inc., Ridgefield, Conn.

[22] Filed: June 12, 1972

[21] Appl. No.: 261,603

[52] U.S. Cl. .......................................... 74/424.8 R
[51] Int. Cl. ............................................. F16h 1/18
[58] Field of Search .................... 74/424.8 R, 89.15; 242/84.42

[56] References Cited
UNITED STATES PATENTS

| | | | |
|---|---|---|---|
| 1,263,487 | 4/1918 | Thorne | 74/424.8 R X |
| 1,293,759 | 2/1919 | Groot | 74/424.8 R X |
| 1,612,524 | 12/1926 | Monohon | 74/424.8 R |
| 2,084,321 | 6/1937 | Corradino et al. | 74/424.8 R X |
| 2,477,343 | 7/1949 | Merwin | 74/424.8 R X |
| 2,788,424 | 4/1957 | Huelskamp et al. | 74/424.8 R X |

Primary Examiner—Leonard H. Gerin
Attorney—H. Gibner Lehmann

[57] ABSTRACT

A reversing nut for use with a diamond thread screw having criss-crossed threads. The nut has an annular body and includes a through bore to receive the screw. A fixed pin extends part way into the bore for engagement with the screw threads. The nut is further provided with a pair of movable pins extending into the bore, also engageable with the screw threads. The movable pins are mounted on slide members which are carried by the nut, the slide members being movable between limiting or extreme positions in directions parallel to the axis of the nut. A reversal of the direction of travel of the nut can be effected at predetermined intervals along the length of the screw by moving one slide member and pin from one extreme position toward the other extreme position. During the transition, the pin being moved is disposed at an intersection of the criss-crossed threads and thus no interference therewith is encountered. In a similar manner, a reversal of the nut in the opposite direction is effected by movement of the same slide member and pin from its one extreme position toward the other extreme position. Means are provided for actuating the slide members and thus automatically reversing the direction of travel of the nut at both ends of the screw as well as at predetermined points therebetween. Alternatively, the nut can be held against axial travel, while the screw moves axially.

20 Claims, 18 Drawing Figures

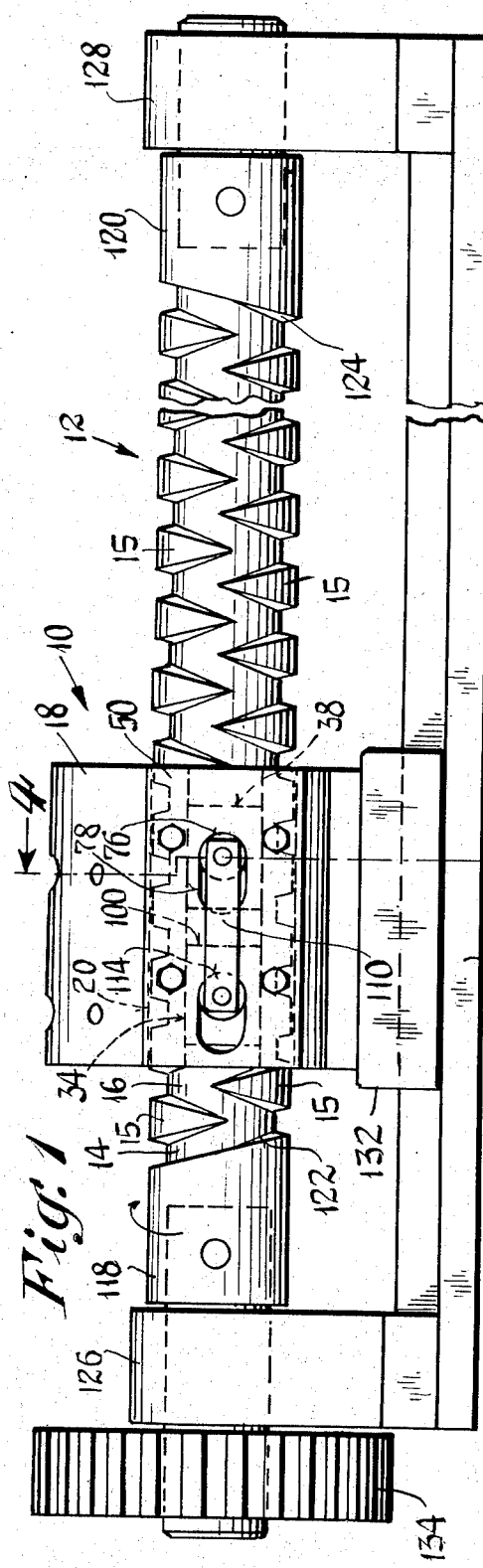
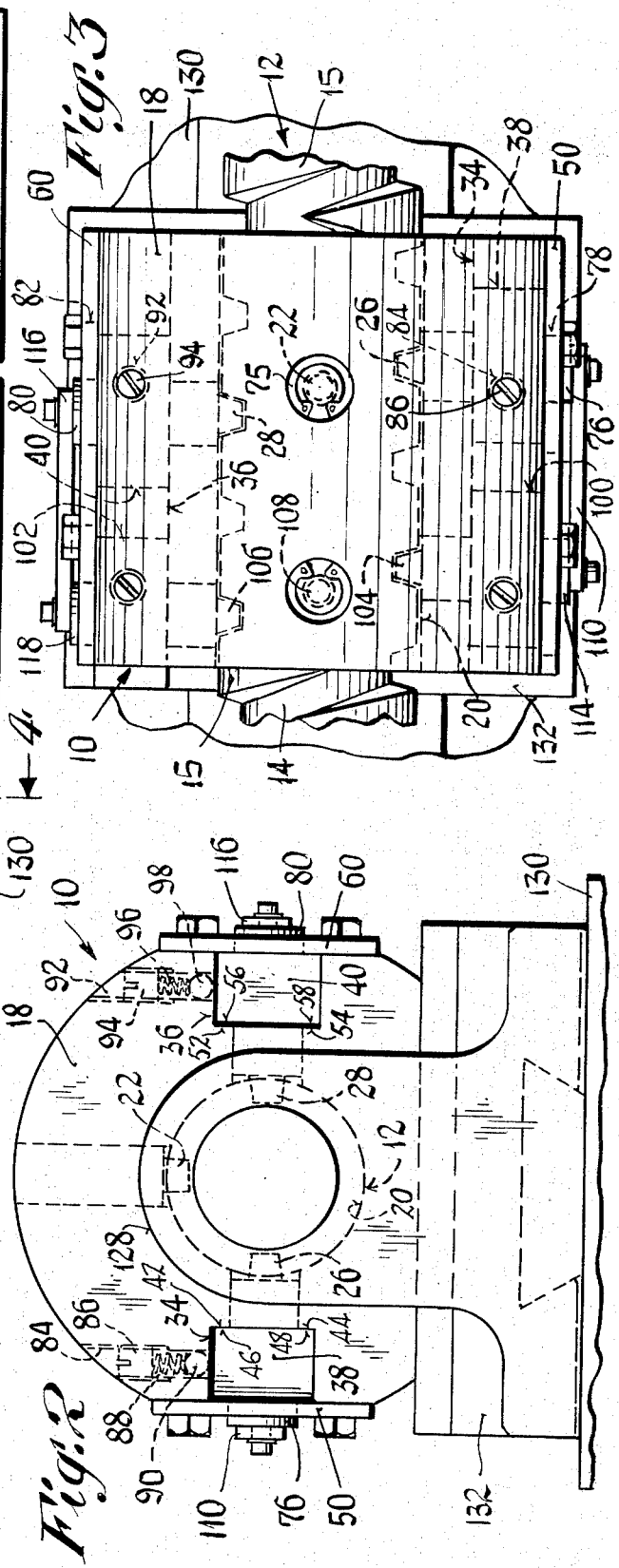

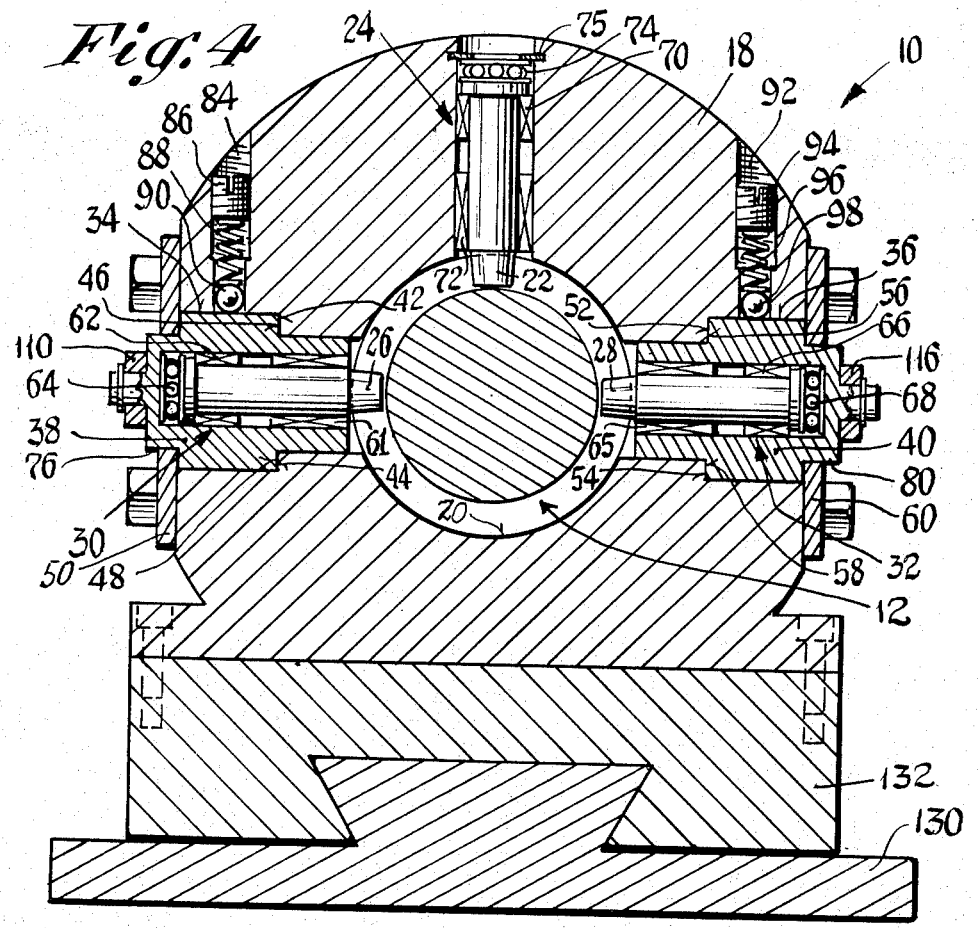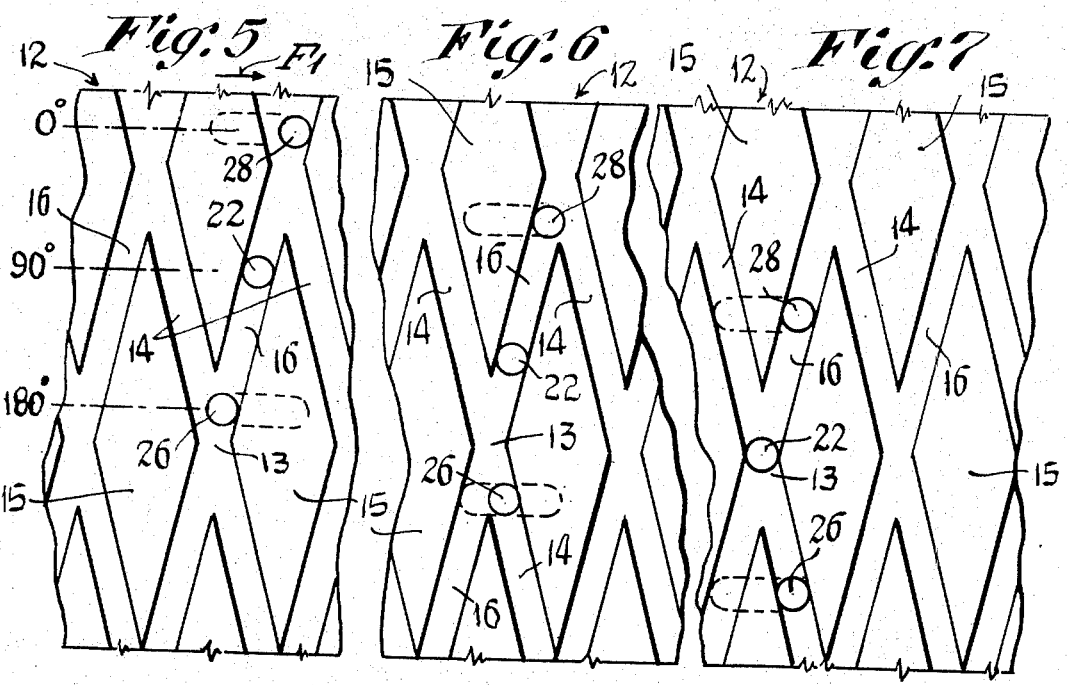

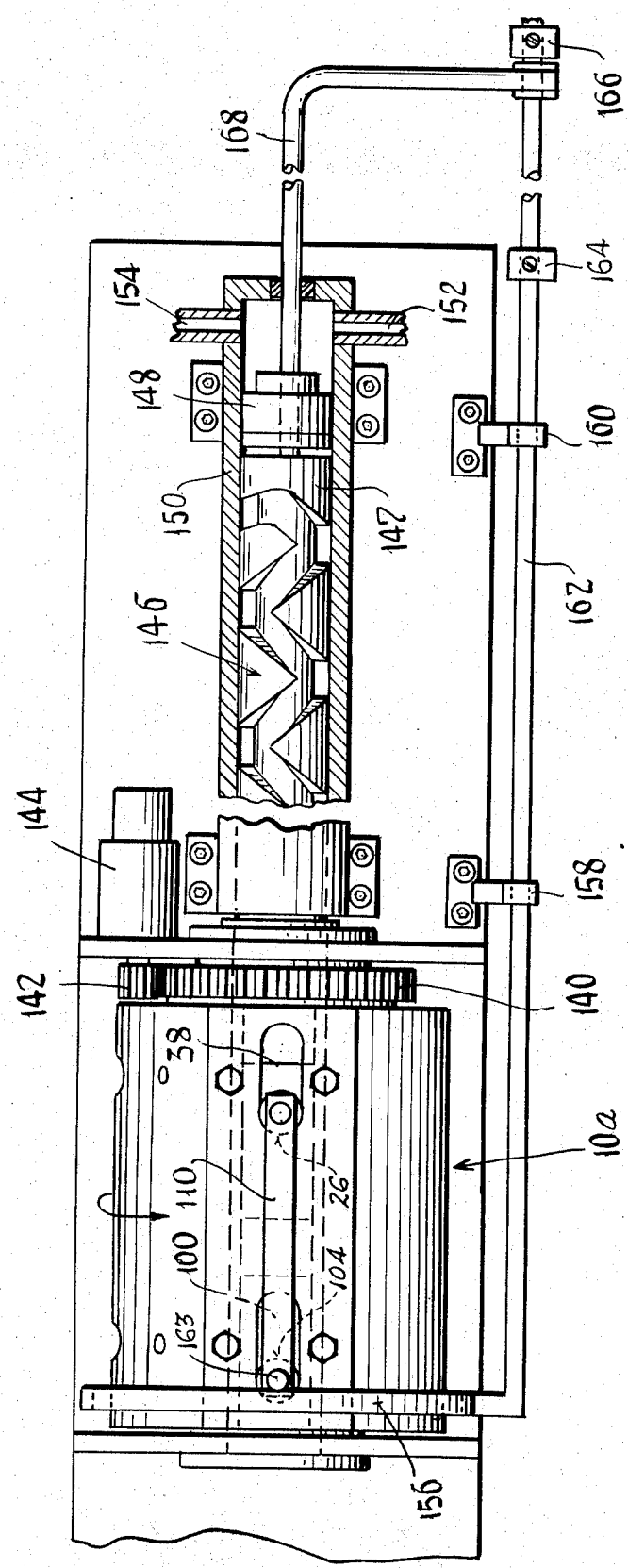

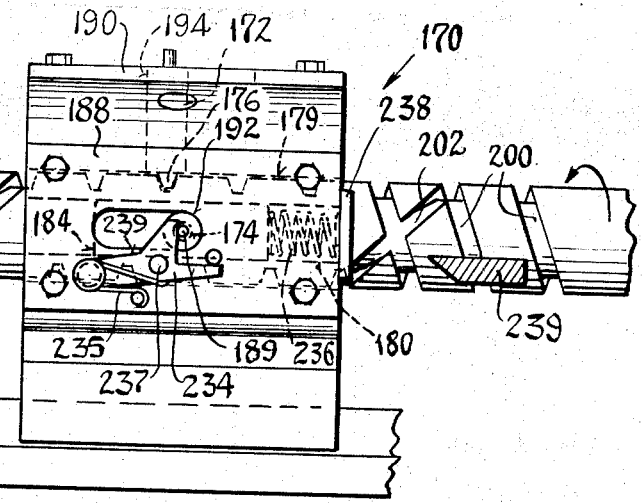
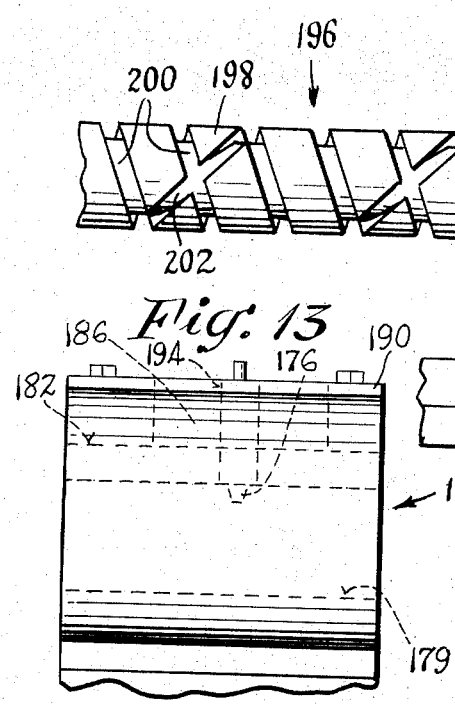
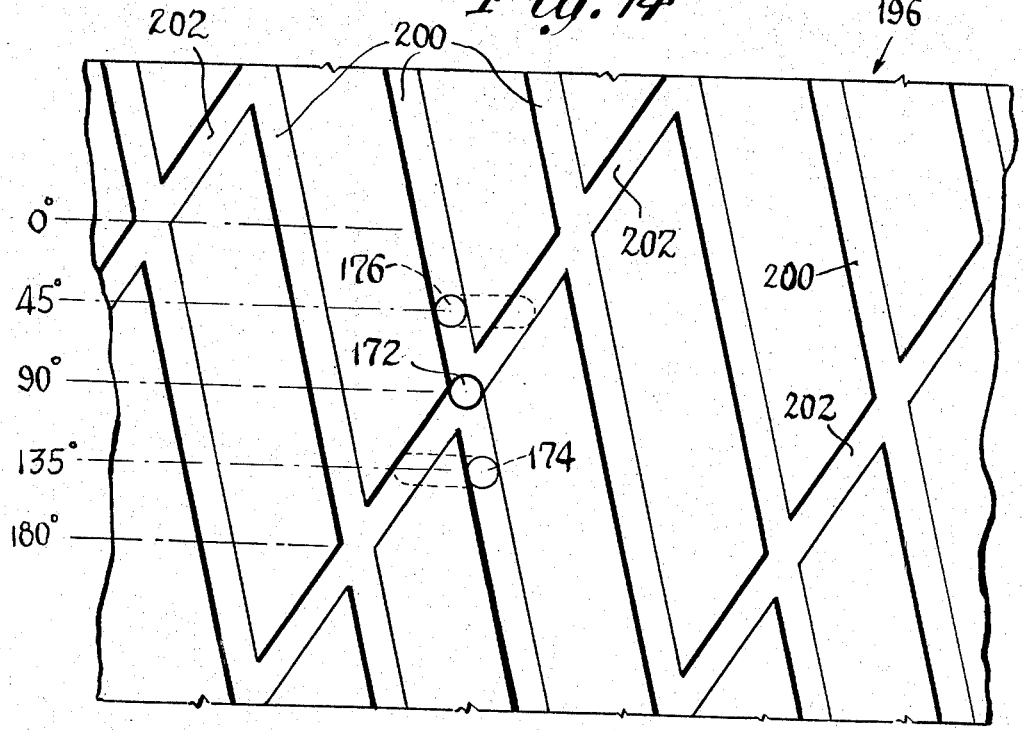

REVERSING NUT FOR A DIAMOND THREAD SCREW

CROSS REFERENCES TO RELATED APPLICATIONS

1. Copending application of Joseph R. Metz entitled "Reciprocating Type Pump," Ser. No. 189,218, filed Oct. 14, 1971, and having common ownership with the present application.

BACKGROUND

This invention relates to nut devices for use with diamond thread screws, and more particularly to such devices wherein automatic reversal of the direction of travel of the nut (or the screw) can be effected for a given sense of relative rotation of the screw (or nut). In the past a number of mechanisms have been proposed and constructed for reversing the direction of travel of a nut carried by a diamond thread screw when the nut has reached the end of the screw thread. Such devices have generally employed a camming groove having a rounded reversing edge at each extremity of the diamond screw. Some nuts have even employed a single fixed pin rigidly carried thereon, engaging the threads of the screw. In such cases, there was the likelihood that the pin would "jump" from one groove to the oppositely directed groove at the intersection thereof, particularly under conditions of axial loading of the nut. Other constructions employed both a fixed pin and an elongated grooved follower rotatably carried thereon. Because the follower "straddled" the intersections of the grooves, the above mentioned "jumping" would not be likely to occur between the oppositely directed threads. In these prior cases, however, a reversal of the direction of travel of the nut could occur only at the ends of the screws, where the somewhat enlarged camming grooves caused a follower to be rotated in alignment with the oppositely directed groove and to thus effect the desired reversal of the nut. This imposed strict limitations on the usefulness of the device, since the distance between the reversing cam grooves determined not only the limits of axial movement of the nut, but also the points where the reversal would occur (namely, the ends of the screw). These parameters were thus fixed for any given installation, and this resulted in a rather inflexible operation, particularly in cases where the devices were used in machine tools such as coil winders and the like.

SUMMARY

The above drawbacks and disadvantages of prior reversing nut devices are obviated by the present invention, which has for an object the provision of an improved reversing nut for use with diamond thread screws, which is especially simple in its construction, easy to fabricate and which permits a higher degree of flexibility than was heretofore possible in diamond thread equipment in that the direction of travel of the nut (or screw) can be reversed not only at the end portions of the screw, but also at a number of predetermined locations spaced along the entire length thereof. A related object of the invention is the provision of an improved reversing nut which is controlled by unique abutment means which enable the automatic reversal of the nut on the thread to be effected when it has reached predetermined positions.

These objects are accomplished by the provision of an annular nut body including a through bore to receive the screw, and further including a fixed pin extending into the bore for engagement with the threads of the screw, in conjunction with a pair of movable pins also extending into the bore and engageable with the threads of the screw. The nut body has longitudinal grooves which receive slide members on which the movable pins are carried. Each slide member and pin can undergo limited movement between extreme positions in directions parallel to the axis of the nut. As the reversing nut moves along its path of travel, the direction of its axial motion can be reversed at predetermined locations (along the length of the screw) by urging one of the slide members and its pin from one extreme position partially toward the other extreme position. Similarly, the axial movement of the nut can be again reversed by urging the same slide member and pin from its existing extreme position toward the other or original extreme position, and this can be done at any one of a number of predetermined locations along the length of the screw.

Still other features and advantages of the invention will hereinafter appear.

In the accompanying drawings, illustrating several embodiments of the invention:

FIG. 1 is a front elevational view of the reversing nut of the present invention, shown engaging a rotatably driven diamond-thread screw.

FIG. 2 is a right end elevational view of the reversing nut and screw of FIG. 1.

FIG. 3 is a top plan view of the reversing nut and screw of FIGS. 1 and 2.

FIG. 4 is a vertical section taken on line 4—4 of FIG. 1.

FIG. 5 is a development of a portion of a diamond thread, and illustrating the relative locations of three pins of the reversing nut with respect thereto as the nut is travelling to the left relative to a stationary screw.

FIG. 6 is a development similar to that of FIG. 5, illustrating a point where one of the movable pins can be shifted to effect a reversal in the direction of axial travel of the nut, the nut still however travelling in the same direction relative to the screw at this point.

FIG. 7 is a development similar to that of FIGS. 5 and 6, illustrating the relative position of the pins at the point where the nut reverses its axial direction of travel.

FIG. 11 is a top plan view of a mechanism constituting still another embodiment of the invention, wherein a reversing nut is used in conjunction with a pump having a piston and a cylinder. The nut is rotatably driven and prevented from moving axially. Movable abutment means cooperable with the diamond thread screw effect automatic reversal of the axial movement of the diamond thread screw and piston.

FIG. 12 is a front elevational view of yet another embodiment of the invention, wherein a reversing nut having a single fixed pin and two slidable pins is employed with a diamond thread screw having oppositely directed thread grooves of different pitches.

FIG. 13 is a rear elevational view of the reversing nut of FIG. 12.

FIG. 14 is a development of a portion of the diamond thread of FIG. 12 illustrating the relative locations of three pins of the reversing nut with respect thereto as the nut is travelling toward the right in FIG. 12.

Figure 15:
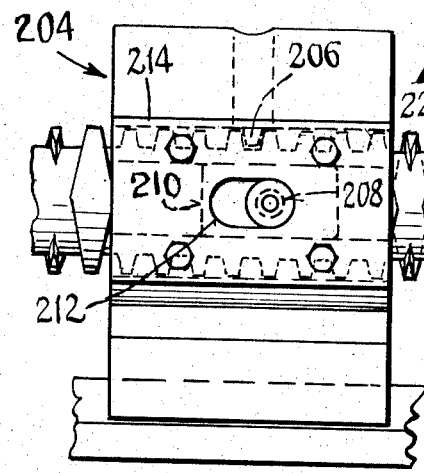

FIG. 15 is a front elevational view of yet another embodiment of the invention, wherein a reversing nut having a single fixed pin and two slidable pins is employed with a diamond thread screw having a segment of a groove characterized by zero pitch at one end, to enable the nut to undergo a dwell at the end of the screw.

Figure 16:
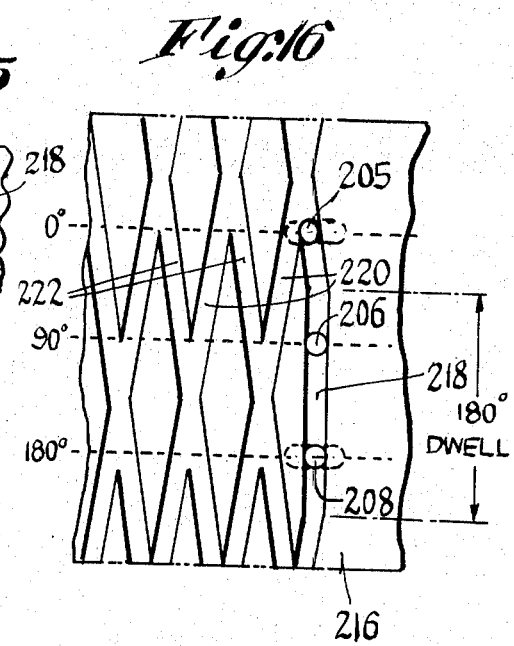

FIG. 16 is a development of the diamond thread of FIG. 15, particularly illustrating the segment of a groove of zero pitch at the end of the screw, and the locations of the three pins at one point during the dwell.

Figure 17:
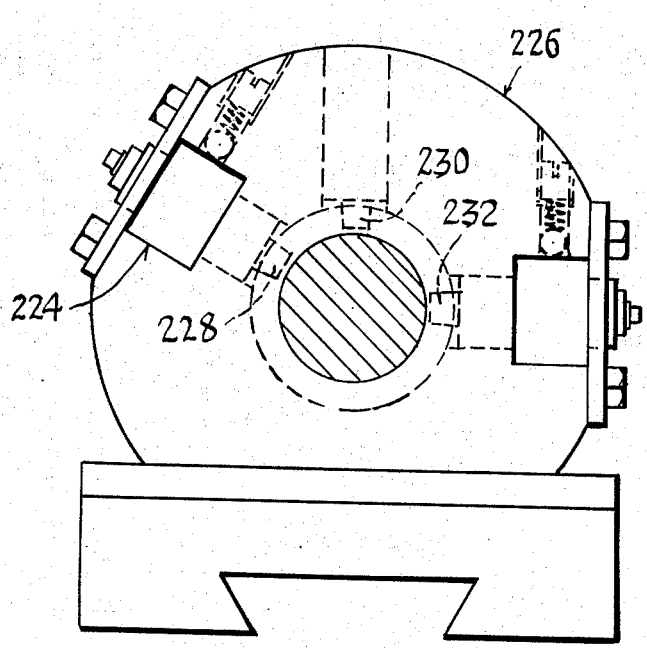

FIG. 17 is a side elevational view of still another embodiment of the invention wherein one of the slidably mounted pins is disposed at an oblique radial angle with respect to the fixed pin, to thereby effect an axial displacement of the reversing points, with respect to previously outlined points.

Figure 18:
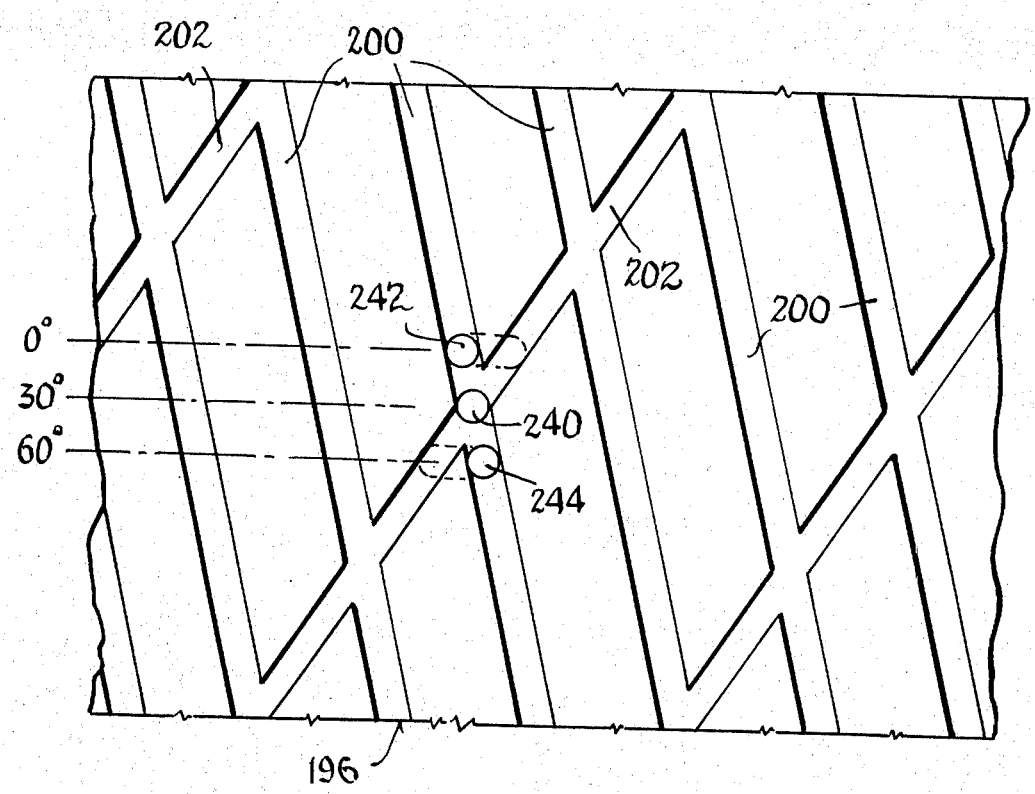

FIG. 18 a development similar to FIG. 14 of the diamond thread screw 196, showing the locations of one fixed and two movable pins of an alternate reversing nut, constituting another embodiment of the invention.

Referring first to FIGS. 1–4 there is illustrated a reversing nut generally designated by the numeral 10, for use with a diamond thread screw 12 having a single thread 15 and having criss-crossed grooves 14 and 16 providing angular surfaces on the thread 15. The nut 10 has an annular body 18 provided with a through bore 20 to receive the screw 12. In accordance with the present invention, the nut 10 has a unique construction comprising a pin 22, carried by an anti-friction bearing 24, in conjunction with a pair of movable pins 26 and 28 (which are also carried on anti-friction bearings 30 and 32 respectively), the pins 26 and 28 being capable of movement in directions parallel to the axis of the nut body 18. The pins extend into the bore 20 for engagement with the walls of the grooves 14 and 16 of the diamond screw 12.

As best illustrated in FIGS. 1 and 4 the nut body 18 is provided with longitudinal grooves or recesses 34 and 36 which receive slide members 38 and 40. The recess 34 has shoulders 42 and 44 which are in abutment with corresponding flange portions 46 and 48 of the slide member 38 when the latter is mounted. The slide member 38 is held captive in the recess 34 by a cover plate 50 which is fastened to the nut body 18 by bolts as shown. In a similar manner, the recess 36 has shoulders 52 and 54 which are in abutment with the corresponding flange portions 56 and 58 of the slide member 40, the slide member being held captive by a coverplate 60 fastened to the nut body 18 by bolts as shown.

Referring again to FIG. 4, the one movable pin 26 is turnably carried on the slide member 38, as by the needle bearings 61 and 62 and a thrust bearing 64. In a similar manner the other movable pin 28 is turnably carried by the slide member 40, as by the needle bearings 65 and 66 and a thrust bearing 68. The non-sliding pin 22 is also provided with needle bearings 70, 72 and a thrust bearing 74 to enable it to freely rotate about an axis perpendicular with respect to that of the nut body 18. The bearing assembly and pin are held in place by means of a retainer washer 75.

Further, in accordance with the present invention, there is provided a stop means carried on the nut body 10 for limiting the axial movement of the slide member 38 and pin 26 between two extreme positions, said stop comprising a circular end wall 76 of reduced thickness of the slide member 38, the end wall 76 being receivable in an elongate slot 78 of the coverplate 50. The slide member 38 is illustrated in FIG. 1 in one extreme position, wherein the end wall 76 engages one end of the slot 78, the other extreme position (not shown) being defined by engagement of the wall 76 with the opposite end of the slot 78. Similarly, the other slide member 40 has a circular end wall 80 of reduced dimension, receivable in an elongate slot 82 of the coverplate 60. Slide member 40 is slidably movable between two extreme positions defined respectively by the engagement of the end wall 80 with the opposite ends of the elongate slot 82.

According to the invention there is also provided a detent means carried on the nut body 18, engageable with the slide member 38 for frictionally restraining the longitudinal movement thereof so as to prevent inadvertent sliding or actuation. The body 18 has a threaded socket 84 which communicates with the longitudinal recess 34. A set screw 86 disposed in the socket 84 engages a spring 88, which in turn biases a detent ball 90 into engagement with one lateral surface of the slide member 38 and thus frictionally restrains the latter from inadvertent axial movement along the recess 34. It will be understood that adjustment of the set screw 86 will vary the force exerted by the ball 90 on the slide member 38, thus providing means for adjustment of the restraining force exerted by the detent means on the slide member. Similarly, another socket 92 has a set screw 94 engaging a spring 96 which in turn urges a ball 98 into frictional engagement with the slide member 40, and thus provides a frictional detent therefor in the manner described above.

The operation of the reversing nut can now be readily understood by referring to FIGS. 5–8. FIG. 5 is a development of the diamond thread screw 12, and superimposed thereon are the pins 22, 26 and 28 of the nut 10. It is to be noted that the pins 26 and 28 rotate about axes which are parallel to one another, and that the pin 22 rotates about an axis perpendicular to the plane containing the axes of pins 26 and 28, as illustrated by the axial lines in FIG. 5 designated "0°," "90°, " and "180°." It will be understood that each pin engages only one wall of a groove at any given time. As a pin travels in a particular groove, the anti-friction bearing on which the pin is mounted enables the latter to rotate. Thus sliding friction between the pin and the groove is virtually eliminated. The pins 26 and 28 can occupy any position between that shown in solid lines and those indicated by the dotted lines in FIG. 5, subject to the restriction that each of the pins engages one wall of the thread grooves 14 or 16. For purposes of explanation, it will be assumed that the diamond thread screw 12 is held stationary, anthe nut 10 is being rotatably drive, and is travelling in an axial direction toward the left in FIG. 5. For this condition the non-sliding pin 22 and the two slidable pins 26 and 28 will have relative positions as illustrated in FIG. 5. As can be readily seen in FIG. 5, the pins are so disposed as to engage one wall of the groove 16, and to thus carry the nut toward the left. It is seen that any axial load on the nut in the direction indicated by the arrow "$F_1$" is carried by pins 22 and 26 until such time as either pin 22 or pin 26 passes an intersection, wherein the one not at an intersection sustains the full load until the one at the intersection again engages the wall of the groove 16. Since at all times at least one of the pins 22 or 26 is not at an intersection, the nut will travel in one axial direction. It is also seen that loads having the direction of "$F_1$" will not tend to shift pin 26 to the right but instead will tend to maintain it in its extreme left-hand position as shown.

Figure 8:
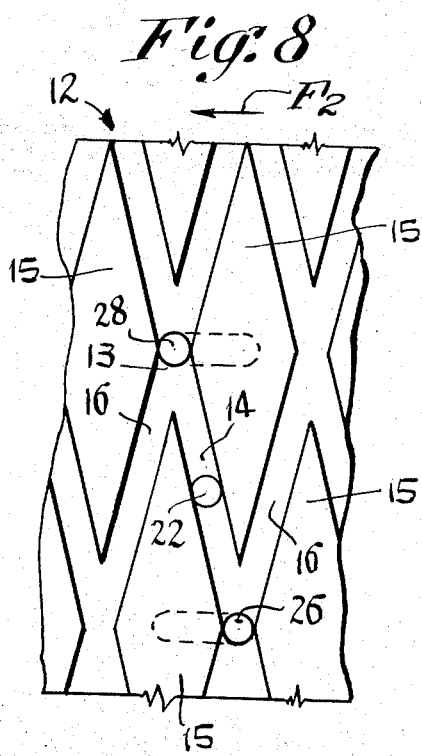
FIG. 8 is a development similar to that of FIGS. 5–7, showing the relative position of the pins after the nut has reversed its axial direction of travel.

Assuming it is now desired to change the direction of axial movement of the nut, it is necessary to effect this when the nut has rotated further such that the lead pin 26 has just reached an intersection 13 of the grooves 14 and 16. The reversal can now be accomplished by shifting pin 26 toward the right (from groove 16 to groove 14) with respect to the nut as the latter is still moving with respect to the screw. As this is done, the pins will reach the relative positions illustrated in FIG. 6. Meanwhile, pin 22 is still travelling in groove 16 and continues to carry the nut toward the left, which will further shift the pin 26 to its right-hand extreme position by the time pin 22 reaches the groove intersection 13, as illustrated in FIG. 7. At this point, the nut reverses axial direction and begins moving toward the right because the pin 26, having been shifted to its right-hand extreme position, engages the wall of the grooves 14. Pin 22 will now, in consequence, follow the path of pin 26 and will travel in groove 14. With the nut 10 travelling to the right, pin 28 is caused to shift (toward the left with respect to the nut) to its other extreme position as illustrated in FIG. 8 by the time it reaches the intersection 13. Axial loading on the nut in the direction of the arrow "$E_2$" will be carried by pins 22 and 26 jointly until one reaches an intersection wherein the load will be carried entirely by the other pin, until the first engages a wall of the groove 14 again. Thus, for a given rotation of the nut, the axial direction of travel thereof has been reversed by shifting one of the slidably carried pins in a direction opposite to that of the axial direction of travel of the nut. In a similar manner the nut 10, moving toward the right in FIG. 8 can undergo a second reversal by shifting the same pin 26 toward the left immediately after it has reached one intersection of the grooves 14 and 16. Thus, reversal of the nut in either direction is accomplished by shifting one of the slidably carried pins immediately after it reaches an intersection of the criss-crossed grooves. In the case where the reversing nut is not rotatable but instead is employed with a rotating diamond thread screw, it can be seen that the operation thereof is analogous to that described above.

As can be seen from FIG. 5, the pins 26 and 28 are movable between extreme positions which are diametrically disposed with respect to the axis of the nut body. The distance between the extreme positions of the pin 28 is one-half the thread pitch. In the case of a 1-inch thread pitch, the pin 28 is slidable between positions spaced one-half inch apart, the same also being true of pin 26. The non-sliding pin 22 is axially spaced from the nearest extreme position of pin 26 (or pin 28) by a distance equal to one quarter the thread pitch, in this case one-fourth inch.

It will be understood that while the pin 28 is shown as located 180° from the pin 26, it could just as well be located in alignment with the pin 26 providing that there is no physical conflict between the pin movements.

Referring now to FIGS. 1-3 there are illustrated additional slide members 100, 102 carrying pins 104 and 106 respectively, the slide members and pins having identical configurations to the slide members 38 and 40 carrying pins 26 and 28 as above described. The slide members 100, 102 are slidably carried in the longitudinal grooves 34 and 36 and retained therein by the cover plates 50 and 60 respectively. An additional non-sliding pin 108 is turnably mounted on the body in a manner similar to that of pin 22. There is further provided a link 110 which joins the end walls 76 and 114 of the slide members 38 and 100, and an additional link 116 joining the end walls 80 and 118 of the slide members 40 and 102. The purpose of the additional pins is to share the load selectively carried by pins 22, 26 and 28, thus reducing the forces thereon to one-half. In order to prevent jamming of the nut mechanism, the link 110 synchronizes the simultaneous shifting of the slide members 38 and 100 when either is manually shifted, and the link 116 synchronizes the simultaneous shifting of slide members 40 and 102 when either is manually shifted.

In accordance with the present invention, FIG. 1 illustrates the use of the reversing nut 10 in conjunction with a pair of novel and collars 118 and 200 having sloped bearing surfaces 122 and 124 respectively, the sloped surfaces having a scalloped configuration. The diamond thread screw 12 is turnably mounted on bearings 126 and 128, which are carried on a slide bar and base 130. The reversing nut 10 is provided with a slider 132 which permits movement of the nut in an axial direction only and prevents any turning thereof. The diamond thread screw 12 can be turnably driven by means of a driven gear 134 which can be powered by an electric motor (not shown) or other source of power. As the diamond thread shaft is turned in the direction indicated, the nut will move in an axial direction to the right.

Figure 9:
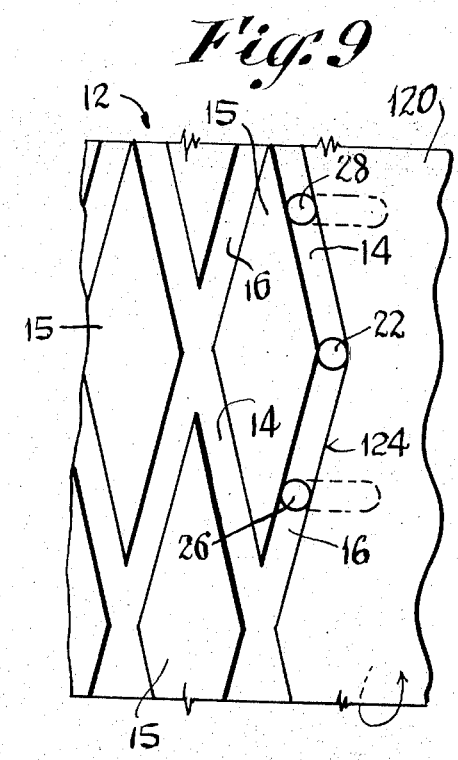
FIG. 9 is a development similar to that of FIGS. 5–8, illustrating the sloped bearing surfaces of the reversing end collar and the manner in which the collar automatically shifts one of the slidable pins to thereby reverse the nut.

Referring to FIG. 9, it will be seen that as the nut approaches the end collar 120, the first pin to be engaged by the sloped surface 124 of the end collar is pin 126, since it is the lead pin in the direction of travel of the nut. The engagement of the sloped surface 124 of collar 120 and pin 26 will thus cause the latter to be shifted towards the left with respect to the nut in FIG. 9 as the nut travels toward the right. Also, the pin 22 riding in the groove 14 will continue to drive the nut toward the right until the pin reaches the next intersection of the threads 14 and 16. The shifting of the pin 26 will effect a reversal of the axial direction of travel of the nut 10 in a manner identical to that described above in connection with FIGS. 5–8. As the nut begins to travel toward the left, pin 28 will now be shifted toward the right to its extreme right-hand position and will thereafter engage the wall of the groove 16. In a similar manner, when the nut 10 arrives at the end collar 118 the first pin to engage the sloped surface thereof is pin 104, which will be shifted to the right (and through link 110 will shift pin 26 simultaneously) thus effecting reversal of the axial direction of travel of the nut. Thus, for a given direction of shaft rotation, the nut will reciprocate back and forth, automatically reversing its axial movement when it arrives at the respective end collars 118, 120.

Figure 10:
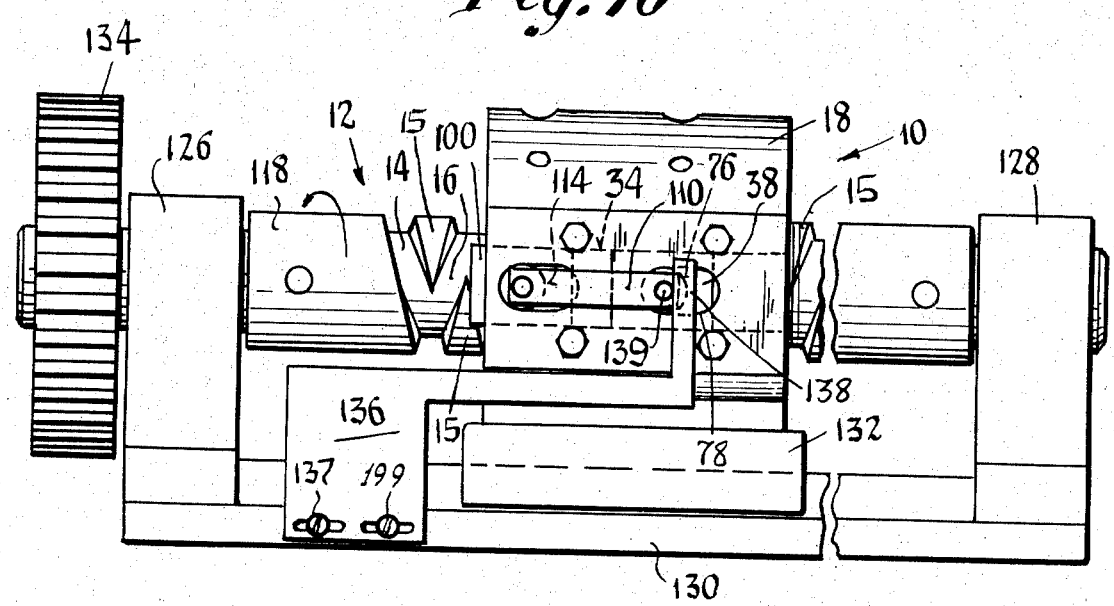
FIG. 10 is a front elevational view of a drive mechanism representing another embodiment of the invention, wherein there is a movable carriage and an abutment for effecting a shift of a movable pin on the nut, for automatically reversing the direction of travel of a latter.

FIG. 10 illustrates another embodiment of the invention, wherein the reversing nut 10 is carried by a slider 132 which permits axial movement of the nut 10 but not rotation thereof. As in FIG. 9, a driven gear 134 turnably drives the diamond thread screw 12, which is carried by bearings 126 and 128 rigidly mounted on the base 130.

In accordance with the present invention there is provided a stationary abutment comprising a carriage 136 mounted on the base, and a slide bar 130, together with an extension arm 138 that is engageable with the slide member 38. The carriage 136 has set screws 137, 139 by which it can be held in a fixed position on the slide bar 130. The carriage 136 can be set at a predetermined point along the base to effect an automatic reversal of the nut 10 when it reaches this point. Assuming, in FIG. 10, that the nut is travelling toward the right in response to rotation of the diamond thread screw 12 in the direction indicated, the end wall 76 of the slide member 38 and link 110 will engage the extension arm 138 of the carriage 136. It is noted that the carriage and arm must be positioned at predetermined intervals along the length of the base and slide bar 130 in order to actuate the proper slidable pins (in this case pins 104 and 26) immediately after they have reached an intersection of the grooves 14 and 16, as described in connection with FIGS. 5–8. Upon the engagement of the extension arm 138 with the boss 139 of the slide member 38 and with the link 110, the axial movement of the nut will effect a shift (toward the left) of the slide member 38, link 110 and slide member 100, and thus cause a reverse of the axial direction of travel of the nut. It will be understood that the carriage 136 can be positioned at any one of a number of predetermined points spaced uniformly along the length of slide bar 130, one limit of the reciprocating stroke of the nut 10 being controlled thereby.

Still another embodiment of the invention is shown in FIG. 11 which illustrates a pump mechanism employing a piston reciprocatably driven by a non-rotating diamond thread screw, the latter being driven in turn by the rotation of an alternate form of the reversing nut of the present invention. The nut 10a has mounted thereto a driven gear 140 engaged by a drive gear 142 which is turnably driven by a motor 144. The diamond thread screw 146 is non-rotating, but instead reciprocatably drives the piston 148. The screw 146 also has mounted thereon a reversing end collar 147 which functions in a manner identical to that previously described (see collars 118 and 120). The cylinder 150 has inlet and outlet ports 152 and 154 respectively.

In accordance with the present invention there is provided a movable abutment comprising a ring 156 extending circumferentially around the periphery of the nut 10a, and means for moving the abutment in a path parallel to the axis of the nut body comprising bars 158 and 160 and a support rod 162. There is also provided a means responsive to the movement of the abutment for longitudinally shifting the slide members 100, 38 respectively carrying the pins 104 and 26 (axially of the nut body), said means comprising a boss 163 rigidly carried by the slide member 100. The boss 163 extends radially past the inner diameter of the ring, and thus can be engaged by the latter to effect shifting of the slide member 100 and pin 104. The support rod 162 has adjustable stops 164 and 166 which are engageable by an angle member 168 that is rigidly fastened to and reciprocates with the piston 148 and screw 146.

The operation of this embodiment may now be understood. With the slide members 38 and 100 in the position shown in FIG. 11 and the nut 10a being rotatably driven in the direction indicated, the diamond thread screw 146 and pistion 148 will be travelling towards the right in FIG. 11. Eventually, the angle member 168 will engage the rightmost stop 166 and thus begin to shift the support rod 162 to the right. This will in turn shift the ring 156 to the right, so as to engage the boss 163 of the slide member 100, thus effecting a shift of the slide members 100 and 38 (and their pins 104 and 26 respectively) to the right, resulting in a reversal of the direction of travel of the screw 146.

It can now be understood that the screw 146 will begin to travel towards the left, and the angle member 168 will engage the other stop 164 so as to shift the ring 156 toward the left. As the screw 146 travels to the left, the reversing collar 147 will be brought into engagement with the pin 26 carried by slide member 38, and as explained above this will effect a reversal of the axial movement of the screw. By the above arrangement the location of the stop 166 may be chosen to occur at predetermined intervals along the rod 162, to thus vary the length of the reciprocating stroke of the diamond thread screw 146 and piston 148.

Here again it should be mentioned that the point at which the pins 26 and 104 are shifted must occur after they have passed an intersection of the diamond thread grooves, and thus location of the stop 166 must be judiciously made to insure that these conditions are met. The stop 166 can be set at intervals along the support rod 162 which are spaced apart a distance equal to one half the pitch of the threads of the diamond thread screw, since the pins to be shifted will pass an intersection of the screw thread grooves twice per revolution of the nut with respect to the screw.

Another embodiment of the invention is illustrated in FIGS. 12-14, wherein a reversing nut generally designated 170 is provided with a fixed pin 172 and two movable pins 174 and 176. The fixed pin is carried on an anti-friction bearing similar to that designated 24 in FIG. 4 of the first embodiment. Both movable pins are carried by anti-friction bearing similar to those designated 30 and 32 in FIG. 4. The nut 170 is provided with a through bore 179 to receive a diamond thread screw. In accordance with the present invention, the nut has longitudinal recesses 180, 182 in which are disposed slide members 184 and 186 respectively, the slide members being retained by cover plates 188, 190. The slide members have circular end walls 192, 194 respectively of reduced thickness, and are movable between extreme positions determined by the engagement of these end walls with ends of the corresponding elongate slots in the cover plates 188, 190. As illustrated in FIGS. 12 and 13, the bore 179 of the nut receives a diamond thread screw 196 having a single thread 198 and criss-crossed grooves 200, 202 providing side surfaces on the thread. By the present invention, the grooves can have different pitches, thus enabling the axial rate of traversal of the nut along the screw in one direction to greatly exceed the rate when the nut is travelling in the opposite direction. In FIG. 12 the pitch of the groove 202 is roughly three times the pitch of the groove 200 whereby the nut can travel in one direction at a rate equal to three times the rate of travel in the opposite direction for a given rate of shaft rotation. The operation of the nut is similar to that discussed in connection with the first embodiment illustrated particularly in FIGS. 1–4. However, in FIG. 12, a latching lever 234 is pivotally carried on the cover plate 188 and biased into engagement with the hub 189 of the slide member 184 by means of a spring 235. A compression spring 236 is disposed in the longitudinal recess 180 tending to bias the slide member 184 toward the left. The other end of the compression spring is seated against an end plate 238. By this arrangement, the movable pin 174 is normally retained in its right-hand extreme position against the action of the spring 236. The lever 234 carries a projecting pin 237 which strikes a fixed, adjustable abutment 239 when the nut 170 travels sufficiently to the right in FIG. 12 and a desired reversal point is reached. Assuming therefore that the nut is travelling to the right in FIG. 12 and the screw 196 is being driven in the direction indicated, reversal of the direction of axial travel of the nut is effected by the abutment 239 releasing the latching lever 234 at a point where the pin 174 is at a groove intersection. As the lever is released, the pin 174 is continually urged toward the left, thus insuring that the pin 174 eventually reaches its left-hand extreme position. This latch is necessary in cases where a screw having different forward and reverse pitches is employed, as in the case of FIGS. 12–14, to provide a sudden impulse to the pin being shifted. This is due to the fact that when a fixed abutment is relied upon to shift a movable pin from a groove of low pitch to a groove having a higher pitch, the nut body displacement is not sufficient to provide adequate shifting movement of the pin after the latter engages the abutment. The spring 236 and latch 234 provide the required impulse force to effect adequate shifting movement thereof. Without this latching arrangement, pin 174 could conceivably undergo a partial shift toward the left, such a shift being insufficient to carry it into the oppositely directed groove. This partial shift could conceivably cause an undesirable malfunction of the mechanism. As illustrated in FIG. 12, the latch 234 has a camming surface 239 by which it can be momentarily actuated by the hub 189 of the movable pin 174, as the latter is being shifted toward the right from its left-hand extreme position. It will be understood that the movable pin 174 will occupy such a left-hand extreme position when the nut 170 is travelling toward the left in FIG. 12, and that a shift of the direction of travel of the nut (so as to travel toward the right) would be effected by the engagement by a suitable fixed abutment (not shown) of the same movable pin 174 to thereby shift the latter toward the right, with respect to the nut.

FIG. 14 is a development of the screw 196, illustrating the different pitches of the grooves 200 and 202, and the locations of the fixed pin 172 and movable pins 174 and 176 of the nut. The movable pins are shown in solid lines occupying the groove 200 having the lesser pitch of the two grooves. The opposite extreme positions of the movable pins 174 and 176 are shown in dotted lines, wherein the pins are occupying the groove 202 having, in this case, three times the pitch of groove 200. As shown, the movable pins are disposed 45° apart from the fixed pin 172. The latching lever 234 is employed to retain the pin 174 in its right-hand extreme position when the nut is travelling toward the right. Upon its release by the lever, the pin is continually urged toward the left to insure that it arrives at its left extreme position and occupies groove 202 and does not come to rest at an intermediate position wherein it could conceivably continue to travel in groove 200.

FIG. 18 is another development of the diamond thread screw 196, showing the relative locations of the pins of an alternate reversing nut, constituting another embodiment of the invention. As shown, the nut has a single fixed pin 240 and two movable pins 242 and 244 respectively. In contrast to the pin locations depicted in FIG. 14, the pins 242 and 244 have angular positions about the periphery of the nut which are spaced 30° from the radial position of the fixed pin 240. The movable pins 242 and 244 are shown in solid lines, occupying the groove 200. Assuming the nut is travelling toward the right in FIG. 18 with respect to a stationary screw 196, reversal of the axial direction of travel is effected by shifting the lead pin 244 toward the left in FIG. 18 at a point where it has just passed an intersection, such that it will begin to travel in groove 202 and arrive at its left-hand extreme position illustrated in FIG. 18. (The pin 242 will be shifted to its right-hand extreme position with respect to the nut once the latter begins to travel toward the left.) It will be understood that a wide range of angular displacements between the fixed pin 240 and the movable pins 242 and 244, such as 45° or 60°, will function in the manner similar to that described above in connection with the 30° displacement.

FIG. 15 illustrates yet another embodiment of the invention. The reversing nut 204 employs a single fixed pin 206 and two movable pins 205 and 208, only one of which is shown in FIG. 15 and designated 208. The pin 208 is carried on an anti-friction bearing, and the bearing is carried on the slide member 210, which is slidably movable between extreme positions as determined by the slot 212 in the cover plate 214. In accordance with the present invention, there is provided a diamond thread screw 216 having at one end a segment of a groove 218 characterized by zero pitch. The groove 218 communicates with the criss-crossed grooves 220, 222 of the screw 216. As illustrated in the development of FIG. 16, it can be readily understood that with the screw rotating as indicated in FIG. 15, and with the nut 204 travelling toward the right, the right-hand most pin 208 will be the first to engage the groove 218 of zero pitch. As the fixed pin 206 enters the groove of zero pitch, it can be readily seen that a shift towards the left of the pin 208 will occur, and the nut 204 will undergo a dwell at the end of the screw for a portion of a revolution (since the fixed pin 206 is confined to the groove 218 for the interval indicated in FIG. 16 by the designation "180 dwell." Thus, the nut can remain stationary for short periods at the end of the screw. An automatic reversal of the nut takes place immediately following the dwell, as can be seen from FIG. 16.

Yet another embodiment of the invention is illustrated in FIG. 17 wherein an additional longitudinal recess 224 is provided in the nut body 226. As mentioned above, the reversal of the axial direction of travel of the nut must be effected after one of the movable pins has reached a groove intersection. Occasionally, it may be desired to effect this reversal at points between those permitted by the orthogonal configuration of the pins about the periphery of the nut as illustrated in FIG. 4. Such a shift in the point of reversal can be effected by relocating one of the pins at an oblique radial angle with respect to the axis of the first pin. One possibility is illustrated in FIG. 17 wherein one of the movable pins 228 is located at a 60° angle with respect to the axis of the fixed pin 230. The other movable pin is designated 232. A given nut can have a plurality of longitudinal grooves in which additional slide members carrying movable pins can be disposed, thus permitting to be realized a high degree of flexibility in the choice of the points along the screw at which reversal can be effected. The details of the remaining construction illustrated in FIG. 17 are identical to those of the embodiments illustrated in FIG. 4, and the operation of the reversing nut and screw is similar to that discussed in connection therewith.

From the above it can be seen that I have provided a novel reversing nut for use with a diamond thread screw, which is especially simple in its construction, reliable in operation and which provides the unique capability of reversing its axial direction of movement with respect to the screw at a plurality of locations spaced therealong as well as at the screw ends, and which thus represents a distinct improvement and advance in the diamond thread and follower nut art.

Variations and modifications are possible without departing from the spirit of the invention.

I claim:

1. A reversing nut for use with a diamond thread screw having criss-crossed grooves comprising in combination:
   a. an annular body including a through bore to receive the screw,
   b. a thread-engaging pin,
   c. means mounting the pin against lateral movement thereof on the body, said pin extending into the body bore for engagement with the screw thread,
   d. a pair of movable pins carried by the body and extending into the bore thereof, and
   e. means mounting said movable pins on the body for lateral movement in directions parallel to the body axis whereby one or the other of said movable pins can be shifted from engagement with one groove wall to engagement with another groove wall of the screw, thereby to effect a change in the direction of travel of the nut with respect to the screw.

2. A reversing nut as in claim 1, wherein:
   a. said body has a longitudinal recess, and
   b. said movable pin mounting means comprises a slide member movable in said recess and carrying one of said movable pins.

3. A reversing nut as in claim 2, and further including:
   a. cooperable stop means carried on said body and slide member for limiting movement of the latter and said one pin carried thereby, between two extreme positions.

4. A reversing nut as in claim 3, wherein:
   a. said body has a slot,
   b. said stop means comprising a part connected with said one pin and extending through said slot, said part being engageable with the slot ends to restrict lateral movement of the pin.

5. A reversing nut as in claim 2 and further including:
   a. an additional movable pin,
   b. an additional slide member disposed in said recess and carrying said additional movable pin, and
   c. means interconnecting said slide members for simultaneous movements in said recess.

6. A reversing nut as in claim 5, wherein:
   a. said interconnecting means comprises a link.

7. A reversing nut as in claim 2 and further including:
   a. detent means carried on said body and engageable with said slide member for frictionally restraining the movement of the latter axailly with respect to said body, thereby to prevent inadvertent actuation thereof.

8. A reversing nut as in claim 7, wherein:
   a. said body has a socket communicating with said recess,
   b. said detent means comprising a ball movably carried in said socket, and comprising spring means in the socket for urging said ball against said slide member.

9. A reversing nut as in claim 8, wherein:
   a. said socket has internal screw threads, and
   b. a screw engaged with the threads of said socket and also engaging said spring means to effect adjustment thereof.

10. A reversing nut as in claim 2, wherein:
    a. said body has a second longitudinal recess spaced circumferentially thereon from said first-mentioned recess,
    b. said movable pin mounting means comprising a second slide member movable in said second recess and carrying the other of said movable pins.

11. A reversing nut as in claim 1, and further including:
    a. a screw disposed in the bore of the annular body and having criss-crossed grooves, and
    b. a pair of end collars rigidly mounted on opposite ends of said screw, said collars having sloped bearing surfaces engageable by said movable pins whereby the latter can be shifted laterally to automatically reverse the movement of the nut.

12. A reversing nut and screw as in claim 11, wherein:
    a. the sloped surfaces are of scalloped configuration.

13. A reversing nut as in claim 1, and further including:
    a. a screw disposed in the bore of the annular body and having criss-crossed grooves,
    b. a stationary abutment, and
    c. means cooperable with said abutment for automatically shifting one of said movable pins as said annular body travels along said screw.

14. A reversing nut and screw as in claim 13 and further including:
    a. means engageable with said screw, providing bearings therefor,
    b. said stationary abutment being connected to said bearing means for the screw.

15. A reversing nut as in claim 1, and further including:
    a. a screw disposed in the bore of the annular body and having criss-crossed grooves,
    b. means mounting the nut for turning while preventing its axial movement,
    c. a movable abutment,
    d. means mounting said abutment for movement in a path parallel to the axis of the nut body and screw, e. means responsive to turning of the nut and travel of the screw for shifting said abutment along its path of travel, and f. means acted on by said abutment during the movement thereof, for shifting one of said movable pins axially of the nut body to reverse the travel of the screw.

16. A reversing nut and screw as in claim 15, wherein:

a. said shifting means responsive to the turning of the nut comprises said dscrew disposed in the nut bore.

17. A reversing nut and screw as in claim 16, wherein:

a. said movable abutment comprises a collar affixed to said screw, and b. said means mounting one of said movable pins on the body comprises a carrier for said one pin, slidably mounted on the nut body and engageable by said collar to shift said pin.

18. The invention as defined in claim 1, and further including:

a. a screw disposed in the bore of the annular body and having criss-crossed grooves, b. the pitch of one of said grooves being different from the pitch of the other of said grooves, whereby for a given rate of relative rotation between the nut and the screw the axial rate of traversal of the nut along the screw in one direction is different from that of the nut when travelling axially in the opposite direction.

19. The invention as defined in claim 1, and further including:

a. a screw disposed in the bore of the annular body and having criss-crossed grooves, b. said screw having at one end a segment of a groove characterized by zero pitch, communicating with the criss-crossed grooves and enabling the nut to dwell at said end of the screw for a portion of a revolution.

* * * * *